(12) United States Patent
Sun et al.

(10) Patent No.: US 12,620,859 B2
(45) Date of Patent: May 5, 2026

(54) MOTOR STATOR STRUCTURE

(71) Applicant: ASIA VITAL COMPONENTS CO., LTD., New Taipei City (TW)

(72) Inventors: Sung-Wei Sun, New Taipei City (TW); Ming-Che Lee, New Taipei City (TW)

(73) Assignee: ASIA VITAL COMPONENTS CO., LTD., New Taipei City (TW)

( * ) Notice: Subject to any disclaimer, the term of this patent is extended or adjusted under 35 U.S.C. 154(b) by 231 days.

(21) Appl. No.: 18/736,754

(22) Filed: Jun. 7, 2024

(65) Prior Publication Data

US 2025/0350163 A1 Nov. 13, 2025

(30) Foreign Application Priority Data

May 13, 2024 (TW) ................................. 113117610

(51) Int. Cl.
H02K 3/52 (2006.01)

(52) U.S. Cl.
CPC ......... H02K 3/522 (2013.01); H02K 2203/06 (2013.01); H02K 2203/12 (2013.01)

(58) Field of Classification Search
CPC . H02K 3/522; H02K 2203/06; H02K 2203/12
See application file for complete search history.

(56) References Cited

U.S. PATENT DOCUMENTS 6,590,310 B2 * 7/2003 Takano ................ H04N 1/0315
310/216.074

6,741,009 B1 * 5/2004 Ando ....................... H02K 3/52
310/260
8,013,490 B2 9/2011 Hino et al.
9,455,606 B2 9/2016 Ewert et al.

FOREIGN PATENT DOCUMENTS

| | | |
|---|---|---|
| CN | 102801225 A | 11/2012 |
| CN | 210007503 U | 1/2020 |
| TW | 385586 B | 3/2000 |
| TW | M658488 U | 7/2024 |
| WO | 2015010838 A2 | 1/2015 |

OTHER PUBLICATIONS

Search Report dated Jun. 20, 2025 issued by Taiwan Intellectual Property Office for counterpart application No. 113117610.

* cited by examiner

*Primary Examiner* — Sean Gugger
(74) *Attorney, Agent, or Firm* — Demian K. Jackson; Jackson IPG PLLC

(57) ABSTRACT

A motor stator structure includes a plural set of silicon steel laminations, a plurality of insulated supports including at least one wire clamping unit, and a plurality of windings. Each set of the silicon steel laminations is clamped on one of the insulated supports. The wire clamping unit includes at least one wire clamping member, which includes a slide guiding section and a retaining section. The windings are wound around the sets of silicon steel laminations and the insulated supports, and respectively include at least one lead-out wire extended to an outer side of the insulated supports. The outward extended lead-out wire can be moved from the slide guiding section into the retaining section and be firmly held thereto, so as to ensure the lead-out wire is quickly and precisely located at a predetermined position while being pulled tightly.

6 Claims, 8 Drawing Sheets

20

20

MOTOR STATOR STRUCTURE

This application claims the priority benefit of Taiwan patent application number 113117610 filed on May 13, 2024, the disclosure of which is hereby incorporated by reference in its entirety.

FIELD OF THE INVENTION

The present invention relates to the field of motor stator, and more particularly, to a motor stator structure.

BACKGROUND OF THE INVENTION

The cooling fan for use in a super slim notebook computer is subjected to limited axial space, which results in difficulty in aligning it with the welding points for electrical terminals U, V, W, and COM on a motor circuit board. Presently, to complete the electrical connection of the cooling fan to the circuit board, enameled wires are pulled manually to align them with the welding points. This procedure is difficult and highly challenged and the operator requires good eyes and rich experience to handle it. The above welding procedure in conventional motor stator connection requires a relative long time because it could not be done on an automated mass-production line.

A motor stator assembly, which, as shown in FIGS. 1A to 1D, includes a stator core 11 formed of silicon steel laminations, at least one coil winding 12 having at least one lead-out wire 121, a circuit board assembly 13, a plurality of metal posts 14, and a plurality of sleeves 15. The stator core 11 includes a plurality of poles 111 respectively having the coil winding 12 wound therearound. The metal posts 14 respectively include a first end surface and a second end surface; the first end surface is facing upward and the second end surface is fitly attached to the circuit board assembly 13. Each of the sleeves 15 partially encloses one of the metal posts 14 and is formed at a free end with a plurality of circumferentially spaced segments 151, such that a groove 152 is defined between any two adjacent segments 151. The lead-out wire 121 of the coil winding 12 is extended through at least two grooves 152 to straddle across the first end surface of the metal post 14.

In the above prior art motor stator assembly, when the lead-out wire 121 of the coil winding 12 has been manually pulled to extend through at least two corresponding grooves 152, the lead-out wire 121 is further pulled outward to pass by one or two left or right segments 151 before being further extended through two opposing grooves 152. Thereafter, the lead-out wire 121 is pulled outward again to pass by one or two left or right segments 151 and extend through another two opposing grooves 152 before it is finally tied to the segment 151. Since the above lead-out wire connection includes complicate procedures and the operators are not all the same in their experience and skill, the lead-out wires 121 might be unevenly or differently wound or tied to cause broken or loosened lead-out wires 121. Further, since each of the lead-out wires 121 must be wound around and tied to the segments 151 on the metal post 15 multiple times, the whole lead-out wire connection consumes a lot of time and has low operational efficiency, and could not be processed through automated production.

It is therefore tried by the inventor to develop an improved motor stator structure to overcome the problems in the conventional motor stator connection.

SUMMARY OF THE INVENTION

A primary object of the present invention is to provide a motor stator structure capable of solving the above-mentioned problems in the prior art motor stators.

To achieve the above and other objects, the motor stator structure of the present invention includes a plural set of silicon steel laminations and a plurality of windings. The silicon steel laminations are disposed on a plurality of insulated supports, and each of the insulated supports includes a wire clamping unit having at least one wire clamping member. The wire clamping member is provided with a slide guiding section and a retaining section. The windings respectively have a winding section wound around the silicon steel laminations and the insulated supports, and at least one lead-out wire located at a tail end of the winding section to extend toward an outer side of the insulated support. The lead-out wire can be moved from the slide guiding section of the wire clamping member into the retaining section and be firmly held in place in the retaining section.

In the present invention, with the wire clamping unit provided on each of the insulated supports, the lead-out wires of the windings for connecting to a circuit board can be quickly and precisely set to predetermined positions while being pulled tightly to align with the positions on the circuit board for welding the lead-out wires thereto. Therefore, the disadvantages of connecting the lead-out wires manually as found in the prior art can be overcome, enabling automated wire connection of the motor stator.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof.

Figure 1A:
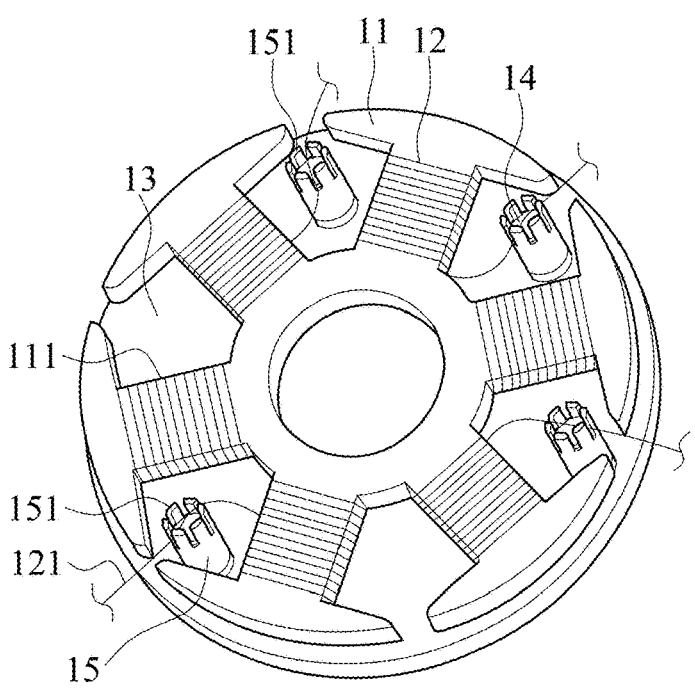
FIGS. 1A to 1D show a conventional motor stator structure.
Figure 1B:
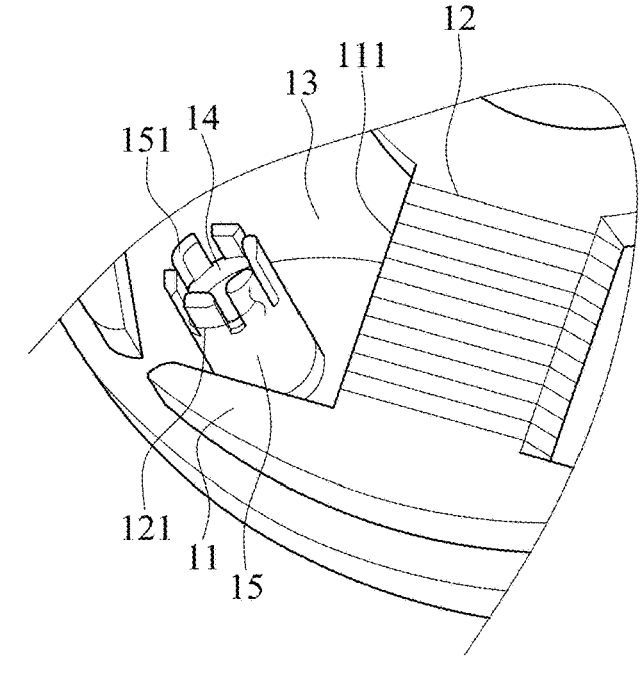
Figure 1C:
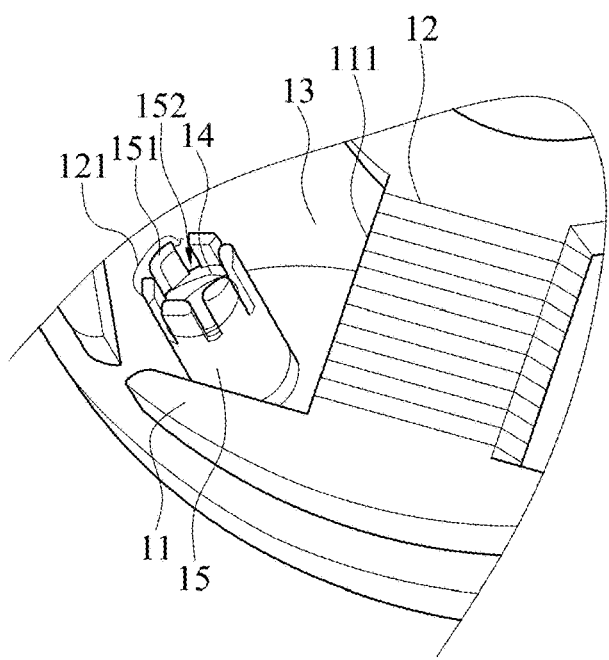
Figure 1D:
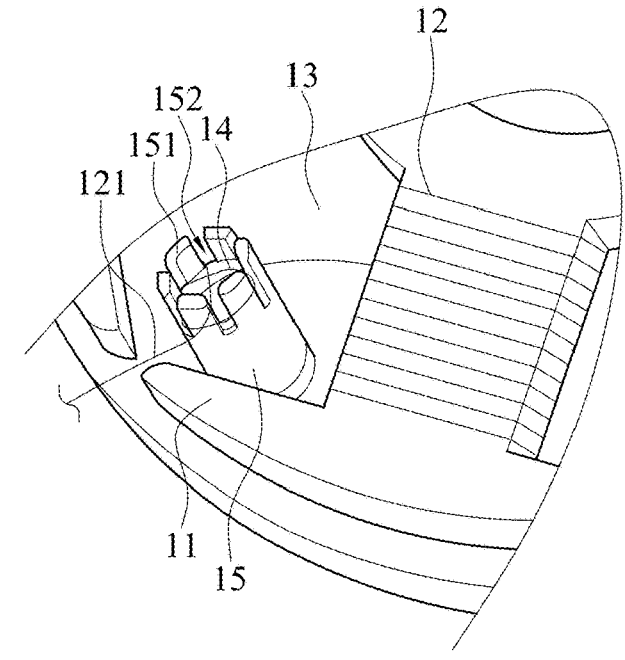
Figure 2:
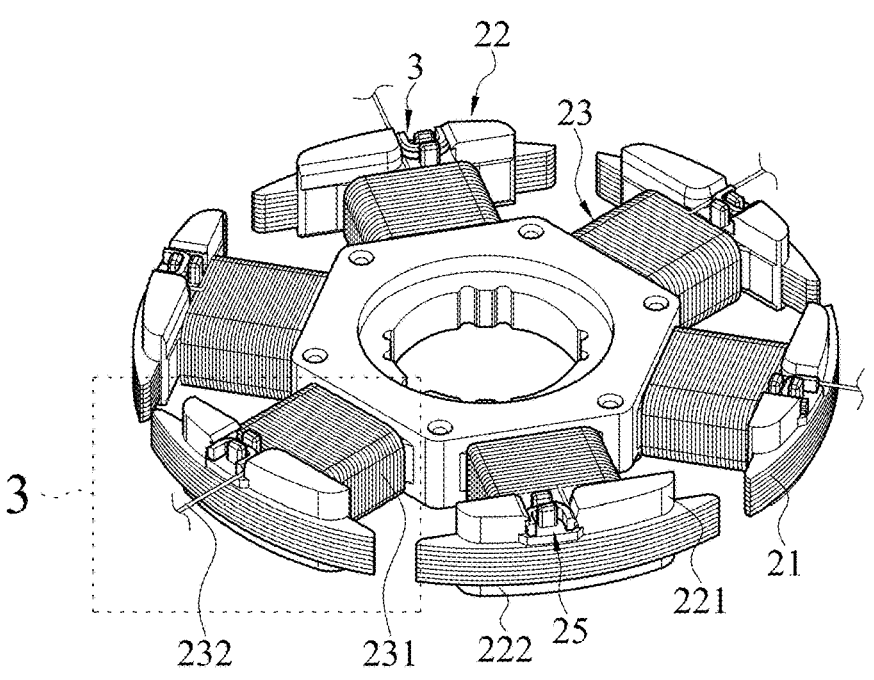
FIG. 2 is a perspective view of a motor stator structure according to a preferred embodiment of the present invention.
Figure 3:
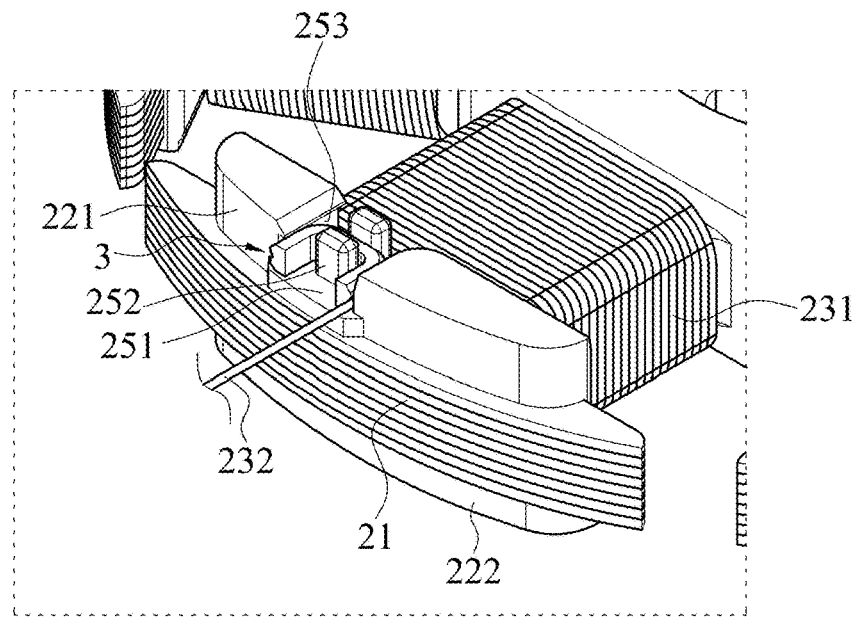
FIG. 3 is a partially enlarged view of FIG. 2.

Please refer to FIG. 2, which is a perspective view of a motor stator structure 20 according to a preferred embodiment of the present invention, and to FIG. 3, which is a partially enlarged view of FIG. 2.

As shown in FIGS. 2 and 3, the motor stator structure 20 according to the present invention includes a plural set of staked silicone steel laminations 21, a plurality of insulated supports 22, and a plurality of windings 23. Each of the insulated supports 22 includes a first insulated support 221 and a second insulated support 222 located above and below one set of the stacked silicon steel laminators, respectively, to clamp the set of silicon steel laminations 21 between them.

Each of the insulated supports 22 further includes a wire clamping unit, which may be integrally formed with the insulated support 22 or be a member separated from the insulated support 22, and can be selectively provided on one of the first insulated support 221 and the second insulated support 222. In the illustrated preferred embodiment of the present invention, the wire clamping unit includes at least one wire clamping member 3 and at least one cooperating member 25.

Figure 5A:
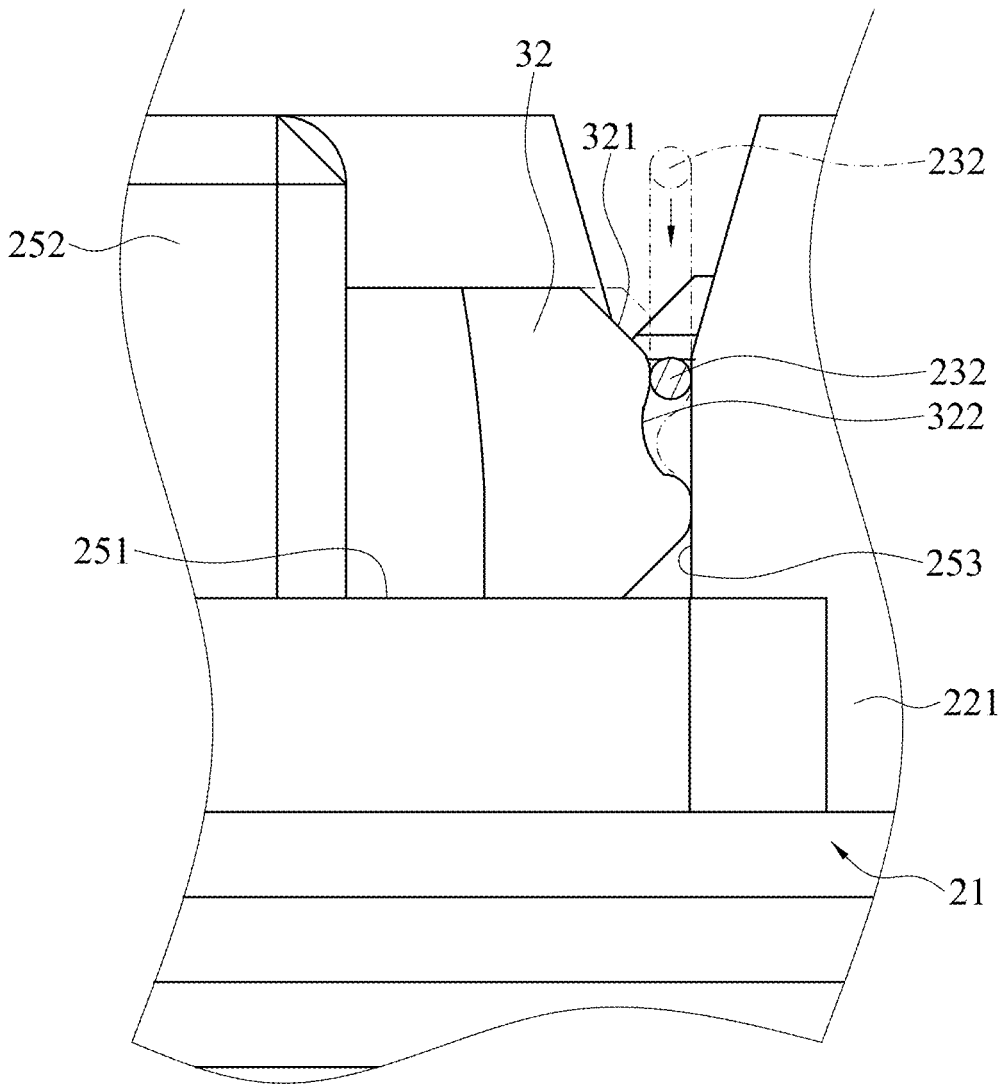
FIGS. 5A and 5B show a lead wire is moved from a slide guiding section into a retaining section of the wire clamping member.
Figure 5B:
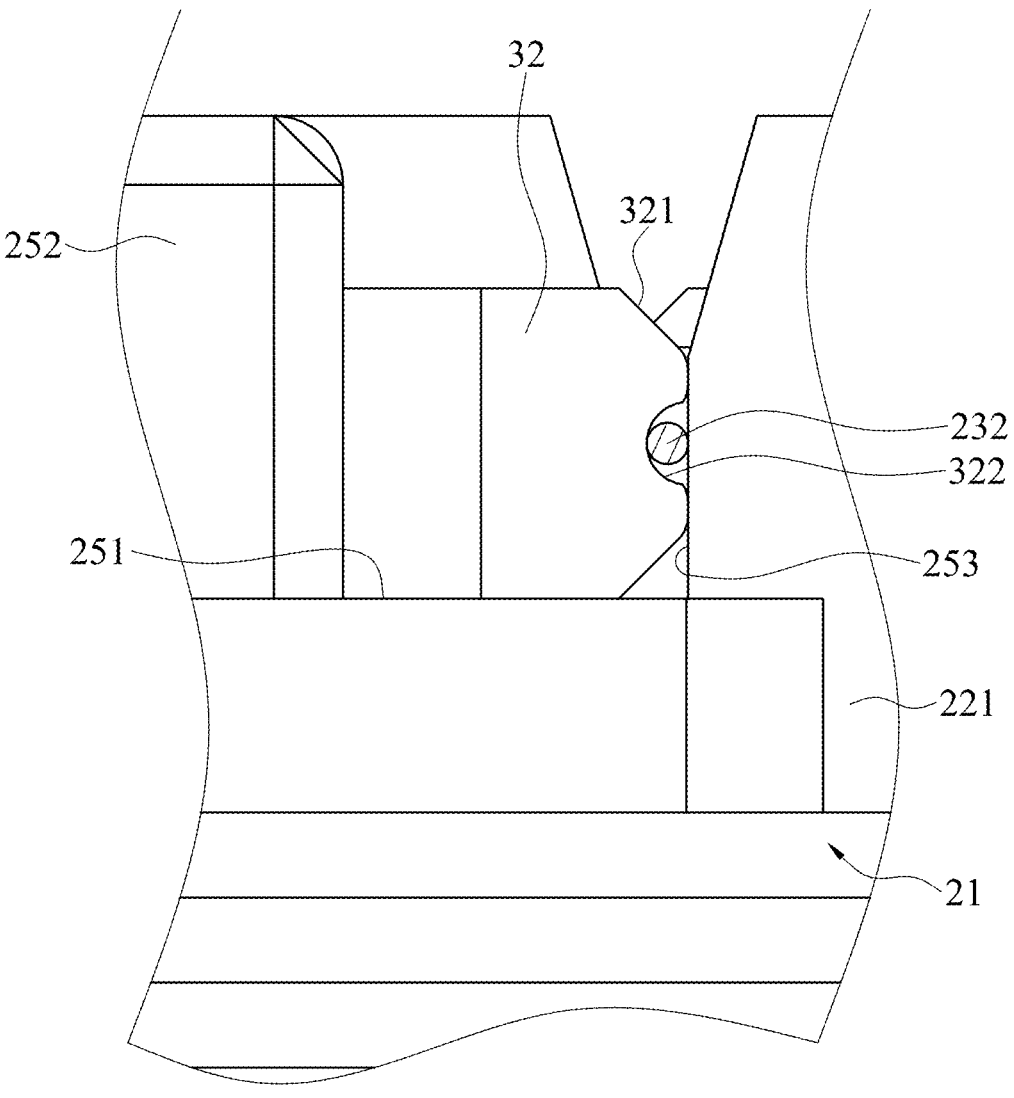

In the illustrated preferred embodiment as shown in FIGS. 3, 5A, and 5B, the cooperating member 25 includes a radially outward opening 251 defined on the first insulated support 221 and having two laterally facing inner walls 253, and two radially spaced clamping ribs 252 located in the opening 251.

Figure 4A:
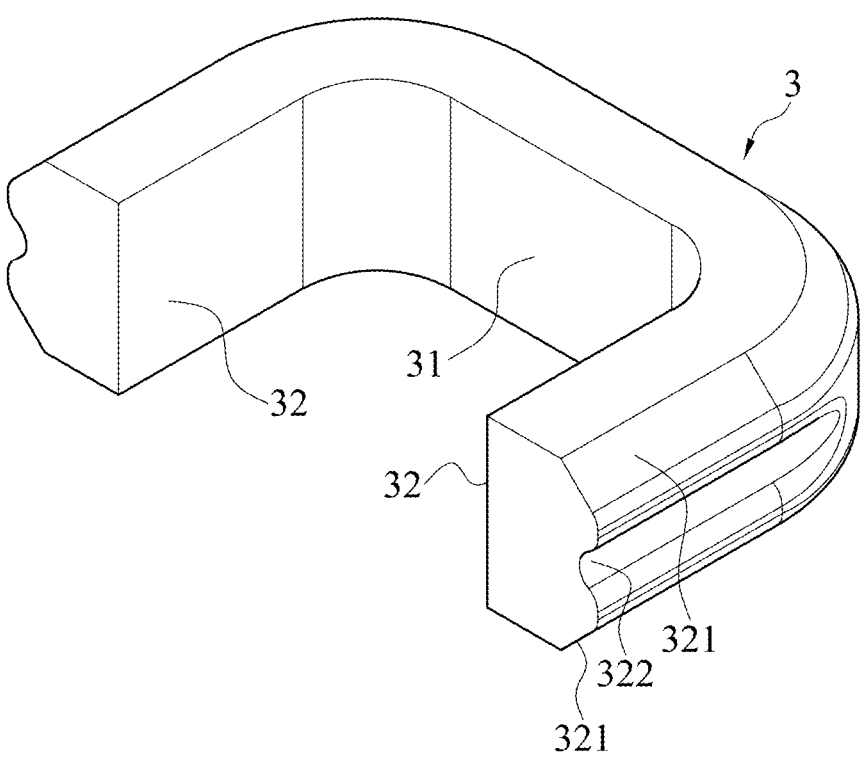
FIGS. 4A and 4B are a perspective and a front view, respectively, of a wire clamping member for the motor stator structure of the present invention.
Figure 4B:
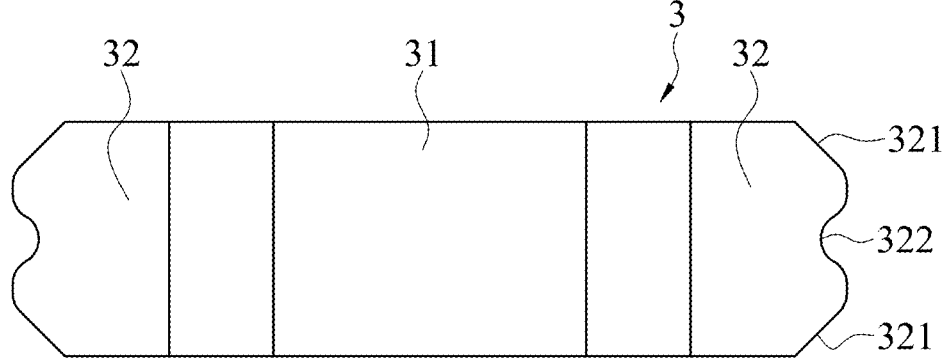

The wire clamping member 3 is disposed in the opening 251 and is illustrated in the preferred embodiment as a U-shaped movable member. However, it is understood the wire clamping member 3 may also be other shapes. As shown in FIGS. 4A and 4B, the wire clamping member 3 includes a fixed clamped section 31 clamped and held in place by the two clamping ribs 252, and two support arms 32 extended radially outward from two ends of the clamped section 31. The two support arms 32 are parallelly spaced from each other and fitly abutted on the two laterally facing inner walls 253 of the opening 251. The two support arms 32 are provided on any one or both of an upper and a lower end surface thereof with a slide guiding section 321, and has a retaining section 322 formed between the two slide guiding sections 321. The slide guiding sections 321 can be, but not limited to, a bevel, a chamfer, or other forms capable of guiding an object to slide into the retaining section 322. The retaining section 322 can be, but not limited to, an elongated recess. Further, in a preferred embodiment, the wire clamping member 3 is made of an elastic material including, but not limited to, silica gel, rubber, thermoplastic elastomer (TPE), thermoplastic urethane (TPU), and other synthetic elastic materials that are elastically deformable and restorable.

The windings 23 respectively include a winding section 231 being wound around the silicon steel laminations 21 and the insulated support 22, and at least one lead-out wire 232 located at a tail end of the winding section 231 to extend to an outer side of the insulated support 22. In the illustrated preferred embodiment, the windings 23 have, but not limited to, three lead-out wires 232 representing three phases U, V and W, and another lead-out wire 232 for use as a common connection terminal (COM).

In FIGS. 5A and 5B, one lead-out wire 232 is used as an example to describe how the lead-out wire 232 is correspondingly set between one support arm 32 of the wire clamping member 3 and one inner wall 251 of the cooperating member 25. When moving the lead-out wire 232 from top to bottom, the lead-out wire 232 is moved from the slide guiding section 321 at the upper end surface of the support arm 32 toward the retaining section 322, bringing the slide guiding section 321 to displace and elastically deform for a short while and move away from the inner wall 253, such that the lead-out wire 232 can slide into the retaining section 322. As soon as the lead-out wire 232 slides into the retaining section 322, the slide guiding section 321 of the wire clamping member 3 elastically restores to abut on the inner wall 253, such that the lead-out wire 232 is tightly held in place to the retaining section 322. In this manner, the lead-out wire 232 can be quickly and precisely held to a predetermined place while being firmly pulled to facilitate subsequent connection to a circuit board by welding.

Figure 6A:
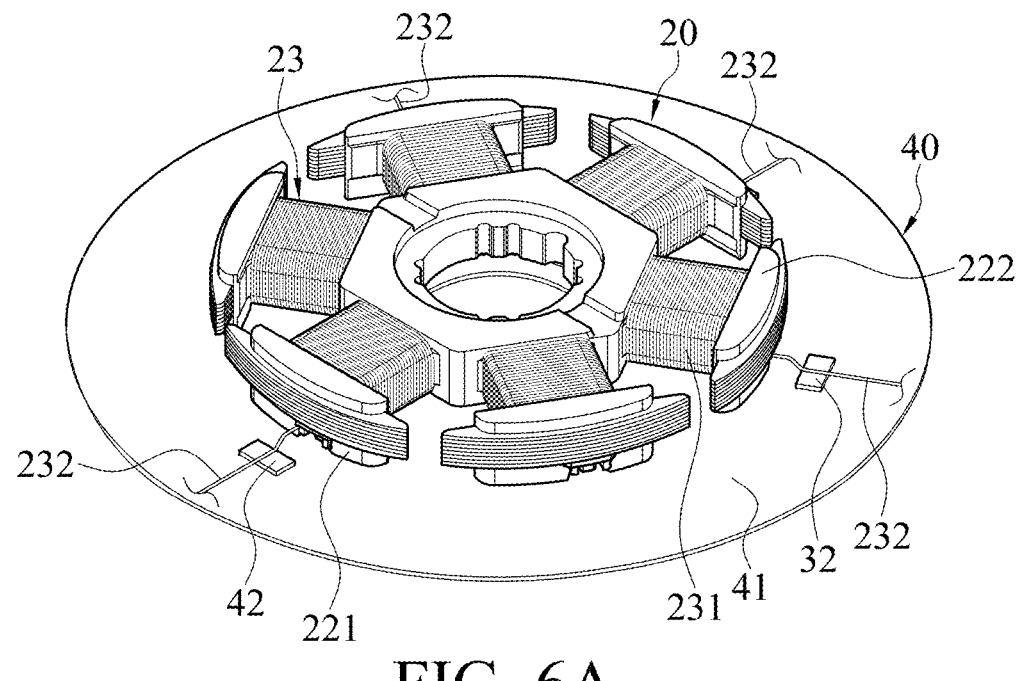
FIGS. 6A and 6B are assembled and disassembled views, respectively, showing the connection of the motor stator structure of the present invention to a circuit board.
Figure 6B:
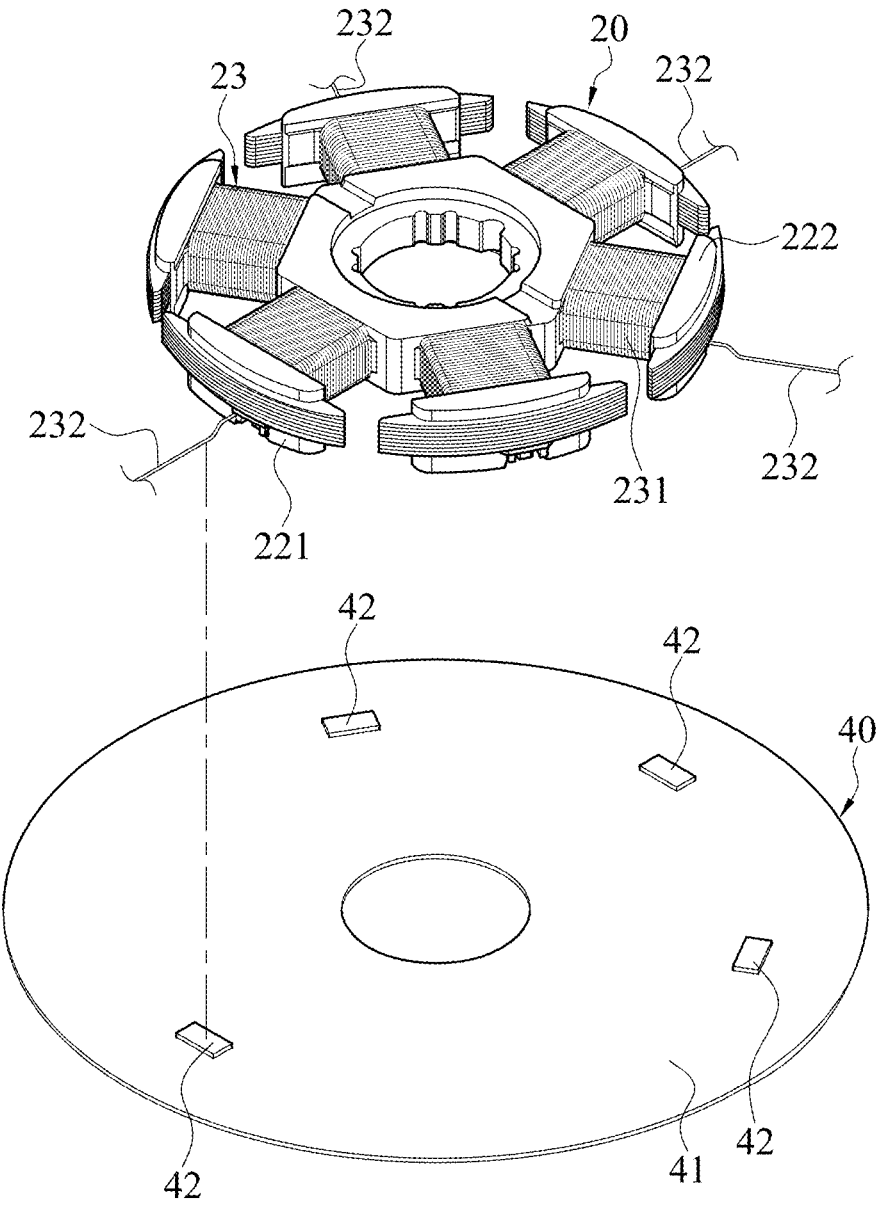

Please refer to FIGS. 6A and 6B, which show the motor stator structure 20 of the present invention is electrically connected to a circuit board 40 for use. The circuit board 40 is provided on a mounting side 41 with a plurality of welding positions 42 and the motor stator structure 20 is installed on the mounting side 41 of the circuit board 40 with the first insulated supports 221 faced toward the mounting side 41 of the circuit board 40. Meanwhile, every lead-out wire 232 is precisely aligned with and then welded to one corresponding welding position 42.

With the above arrangements, the lead-out wires 232 of the windings 23 are firmly and fixedly clamped in place by the wire clamping units of the insulated supports 22, such that the lead-out wires 232 are not only quickly and precisely located in place within shortened time, but also stably and tightly pulled to enable precise alignment with the welding positions 42 on the circuit board 40. In addition, the present invention allows for automated production to effectively overcome the disadvantage of the prior art stator structure that manual operation is required to wind and pull the lead-out wires to align with the welding points, and accordingly, enables upgraded manufacturing efficiency and product reliability.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A motor stator structure comprising:
a plural set of silicon steel laminations disposed on a plurality of insulated supports, and each of the insulated supports including a wire clamping unit having at least one wire clamping member provided with at least one slide guiding section and one retaining section; and
a plurality of windings respectively having a winding section wound around the sets of silicon steel laminations and the insulated supports, and at least one lead-out wire located at a tail end of the winding section; and each of the lead-out wires being extended toward an outer side of the insulated support to pass through the slide guiding section of the wire clamping member into the retaining section and be firmly held in place in the retaining section.

2. The motor stator structure as claimed in claim 1, wherein the wire clamping unit further includes at least one cooperating member, to which the wire clamping member is mounted.

3. The motor stator structure as claimed in claim 2, wherein the cooperating member includes a radially outward opening and two radially spaced clamping ribs located in the opening; the wire clamping member being a U-shaped member disposed in the opening and including a clamped section clamped to between the two clamping ribs and two support arms extended parallelly from two ends of the clamped section in a radially outward direction.

4. The motor stator structure as claimed in claim 3, wherein the two support arms of the wire clamping member respectively have an upper end surface and a lower end surface; the slide guiding section being formed at the upper end surface, and the retaining section being located between the upper and the lower end surface.

5. The motor stator structure as claimed in claim 4, wherein the slide guiding section is a beveled surface and the retaining section is an elongated recess.

6. The motor stator structure as claimed in claim 1, wherein each of the insulated supports includes a first insulated support and a second insulated support; each set of the silicon steel laminations being clamped between the first and the second insulated support of one insulated support, and the wire clamping unit being provided on one of the first and the second insulated support.

\* \* \* \* \*